United States Patent Office 3,699,109
Patented Oct. 17, 1972

---

3,699,109
TROPYL ESTER OF 2-PHENYL-CYCLOHEXEN-3-CARBOXYLATE
Luigi Turbanti, Via B da Padule 10, Pisa, Italy
No Drawing. Filed Oct. 2, 1968, Ser. No. 766,029
Int. Cl. C07d 43/06
U.S. Cl. 260—292  2 Claims

ABSTRACT OF THE DISCLOSURE

The invention provides amino esters, salts thereof and quaternary compounds thereof with alkyl halides, which compounds exhibit a high degree of antispastic activity and antiulcer activity. The invention also relates to the production of these compounds.

---

The present invention relates to products having antispastic and antiulcer activities and is also concerned with a method for preparing such products.

The products according to the present invention comprise 2 - phenyl - cyclohexene - 3 - carboxylic acid, the amino esters of this acid, the salts of these basic esters, and the quaternarization compounds of these basic esters with alkyl halides.

The products according to the invention proved to be useful curative agents as provided with an antispastic activity associated with a normalizing activity of the gastric and intestinal hypercinesia, and an antiulcer activity.

The products according to the invention are defined by the following general Formula I:

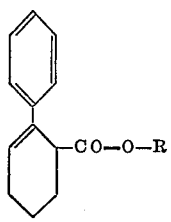

where

R=—H; —CH$_2$—CH$_2$—N(C$_2$H$_5$)$_2$; —CH$_2$—CH$_2$—N(CH$_3$)$_2$ $$-\text{CH}-\text{CH}_2-\text{N}(\text{C}_2\text{H}_5)_2;\ -\text{CH}_2-\overset{\overset{\text{CH}_3}{|}}{\underset{\underset{\text{CH}_3}{|}}{\text{C}}}-\text{CH}_2-\text{N}\diagup\text{O}$$

$$-\text{CH}_2-\overset{\overset{\text{CH}_3}{|}}{\underset{\underset{\text{CH}_3}{|}}{\text{C}}}-\text{CH}_2-\text{N}(\text{C}_2\text{H}_5)_2-\boxed{\text{N}-\text{CH}_3}$$

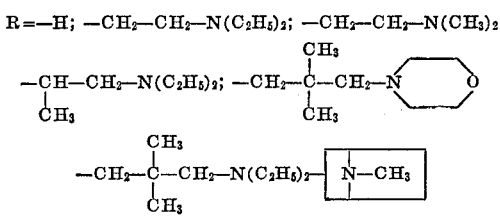

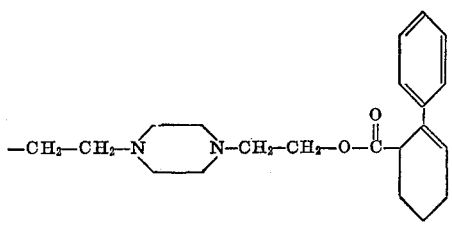

Within the scope of this invention there are also included the salts of these basic esters with some inorganic and organic acids (such as hydrochloric, sulphuric, citric, tartaric and malonic acids), as well as the quaternarization compounds of the above basic esters with alkyl halides (such as CH$_3$I;

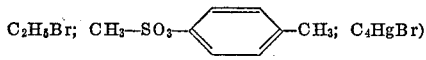

of the type C$_x$H$_y$X, wherein C$_x$H$_y$ is a linear or branched aliphatic chain having from 1 to 10 carbon atoms and X is the chlorine, bromine, iodine atom.

2 - phenyl - cyclohexene - 3 - carboxylic acid (Formula I, wherein R=—H) has been obtained by heating 2-phenyl - 2 - hydroxy - cyclohexan - carboxylic acid (Formula II shown hereinafter) in organic solvents, such as carbon tetrachloride, in the presence of catalytic amounts of mineral acids (such as sulphuric acid), according to the scheme:

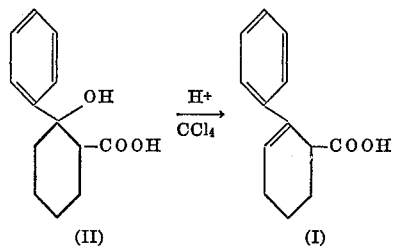

The amino esters have been obtained by the following methods as shown in scheme I:

(a) by treating the sodium or potassium salt of acid (I) with the corresponding amino-alkyl halides in alcohol ambient (such as in isopropanol);
(b) by reacting the chloride of acid (I), being prepared in turn by heating said acid with SOCl$_2$ or by chlorination with PCl$_5$, with the desired amino-alcohol or its potassium salt;
(c) by transesterification reaction from ethyl - 2 - phenyl-cyclohexene-3-carboxylate with the selected amino-alcohol, in the presence of traces of alkaline ethylates.

SCHEME 1

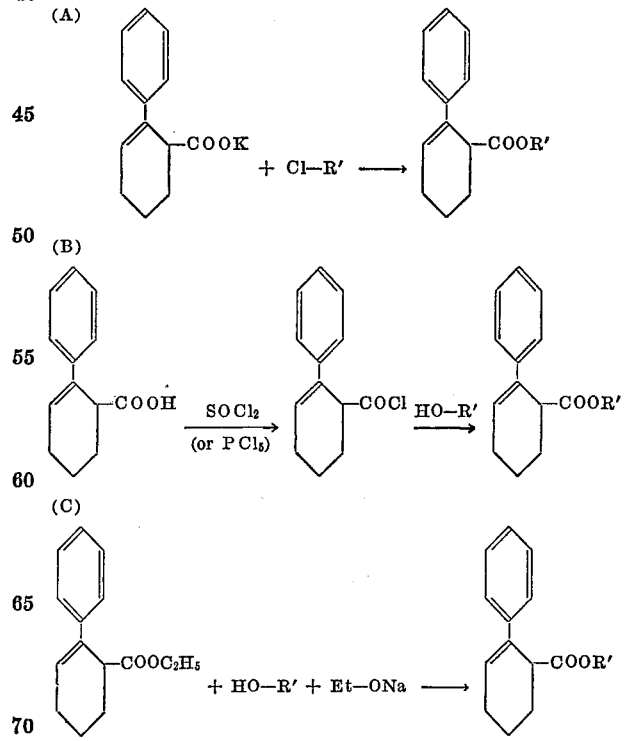

wherein R' is the same as R except where R=—H.

The antispastic activity of the esters has been determined on segments of various insulated organs and it could be appreciated that the most tested products inhibit or prevent the contraction as due to several spasmodic agents both of hormonal and humoral essence and of a different essence; for some of the tested products, such as 2-phenyl-cyclohexene-tropyl carboxylate (Formula I, wherein

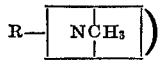

this inhibiting or preventive activity is already apparent at concentrations of $1 \times 10^{-7}$ to $1 \times 10^{-8}$ g./ml. The pharmacological features and the collateral effects of the compounds are substantially superimposable to those of the atropine, whereby the products are particularly suitable for the therapy of spasms in the smooth musculature of the biliary, uro-genital and digestive system tracts. Such a curative use is useful with respect to atropine on account of the higher therapeutic ratio as provided by the pharmaceutics of this invention.

The antiulcer activity has been determined through many tests, such as histamine ulcer, contention ulcer, cesamethazone ulcer and pylorus ligature ulcer. Some of these products proved to effectively inhibit ulcers from being arisen, whereby they can be considered as useful agents in the therapy of gastric and duodenal ulcers.

EXAMPLES OF PREPARATION 2-phenyl-cyclohexene - 3 - carboxylic acid (Formula I, wherein R=—H).

A mixture comprising 50 g. of 2-phenyl-2-hydroxy-cyclohexan-carboxylic acid, prepared in accordance with the method as described in literature, 2 ml. of concentrated sulphuric acid and 500 ml. of carbon tetrachloride is refluxed for 24 hours and thoroughly stirred.

The solvent is removed and the residue is treated with a 10% aqueous solution of sodium bicarbonate and after ether wash the alkaline solution is acidified with diluted hydrochloric acid. 30 g. of crystalline product melting at 76–80° C. are yielded (as crystallized from ligroin). The yield is of 65% the theoretical value.

Method (a): 2-phenyl-cyclohexen-3-carboxylate of 3-diethylamino-2,2-dimethyl-propyl (Formula I, wherein

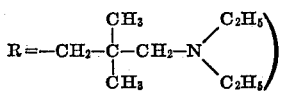

5 g. (0.0248 mol) of 2-phenyl-cyclohexen-3-carboxylic acid, 20 cc. of isopropanol, 0.97 g. (0.0248 mol) of potassium dissolved in 10 cc. methanol were introduced into a three-neck flask and 4.4 g. (0.0248 mol) 3-diethylamino-2,2-dimethylpropyl chloride are added to the solution.

The reaction mixture is stirred and reflux heated for 3 hours, the precipitated potassium chloride is filtered and the solvent vacuum removed.

The oily residue being obtained is dissolved in ether, the ether solution is washed with 10% sodium hydroxyde and then with water until alkalinity is removed, then dried with anhydrous sodium sulphate and vacuum evaporated.

The yellow oily product thus obtained is purified by reduced pressure distillation, thereby obtaining 3 g. yellow oil B.P.$_{0.2\ mm.\ Hg}$ 162–166° C.

Method (b): Tropyl-2-phenyl-cyclohexen-3-carboxylate (Formula I, wherein

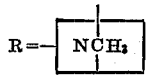

A mixture comprising 4.4 g. of tropine, 1.2 g. potassium and 40 ml. toluol is reflux heated under stirring until complete potassium dissolving. To the toluene suspension being obtained a solution of 2 - phenyl-cyclohexen-3-carboxylic acid chloride (Formula I, wherein R=H) (as prepared by treating 6.26 g. acid with 19 ml. thionyl chloride and then evaporating to dryness) in 30 ml. of toluol is added, and the mixture is reflux heated under stirring for 12 hours.

The solvent is vacuum evaporated, the residue is treated with diluted HCl, the acid solution is ether washed and then alkalinized and accurately extracted with ether.

After dehydration, the ether solution is evaporated, yielding a maroon dense oil, which is purified by fractional distillation at a reduced pressure, B.P.$_{0.1\ mm.\ Hg}$ 168° C.

Method (c): N-methyl - 3 - piperidine-2-phenyl-cyclohexen-3-carboxylate. (Formula I, wherein)

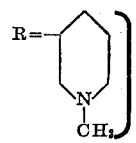

Into a 50 cc. Claisen flask, provided with a Liebig freezer, a vacuum junction and a collecting flask, there are introduced 5 g. (0.027 mol) ethyl-2-phenyl-cyclohexen-3-carboxylate, 5.4 g. (0.047 mol) 3-hydroxy-N-methyl-piperidine, 0.13 g. (0.0057 mol) sodium dissolved in the required amount of ethyl alcohol and the mixture is heated at 120° C. and 80 mm. Hg for 2½ hours.

At heating completion a brick-red oil is obtained and treated with 0.1 HCl. The hydrochloric solution is extracted with ether, alkalinized with diluted sodium hydroxide, the precipitated product is extracted with ether and after drying with anydrous sodium sulphate ether is evaporated.

The raw product thus obtained is purified by fractional distillation at a reduced pressure, yielding 2.35 g. of a yellow fluid oil, B.P.$_{0.05\ mm.\ Hg}$ 154–155° C.

3-diethylamino-2,2-dimethyl-propyl-2-phenyl-cyclohexen-3-carboxylate methyliodide In a flask, provided with a reflux freezer having a tube filled with CaCl$_2$, there are introduced 0.8 g. 3-diethylamino - 2,2 - dimethyl-propyl-2-phenyl-cyclohexen-3-carboxylate, 0.4 g. methyl iodide and 3 cc. methanol, heating the mixture for 7 days in an oil bath at 45° C. Crystal separation not being obtained by cooling, the solvent is vacuum removed, thus obtaining a yellow resinous residue attaining a resinous appearance after ether washes; the compound thus obtained shows analytical features corresponding to the product being expected.

Here below the features for the remaining compounds, as prepared according to the above methods, are described.

3-(N-morpholine) - 2,2 - dimethyl-propyl-2-phenyl-cyclohexen - 3 - carboxylate, obtainable by methods, a, b, c: colourless dense oil, B.P.$_{0.15\ mm.Hg}$ 177–178° C.

2 - diethylamino-1-methylethyl - 2 - phenyl-cyclohexen-3-carboxylate, obtainable by methods a, b, c: light yellow oil, B.P.$_{0.2\ mm.Hg}$ 140° C.

2-dimethylaminoethyl - 2 - phenyl-cyclohexen-3-carboxylate, obtainable by methods a, b, c: colourless fluid oil, B.P.$_{0.2\ mm.\ Hg}$ 130–132° C.

2 - diethylaminoethyl - 2 - phenyl-cyclohexen-3-carboxylate, obtainable by methods a, b, c: colourless oil, B.P.$_{0.1\ mm.\ Hg}$ 146–147° C.

2-(2'-diethylaminoethoxy)-ethyl - 2 - phenyl-cyclohexen-3-carboxylate, obtainable by methods b, c: orange-yellow oil, B.P.$_{0.1\ mm.\ Hg}$ 171–172° C.

N,N'-[2 - (2' - phenyl-cyclohexen - 3 - carboxy)-ethyl]-piperazine, obtainable by methods b, c: light yellow crystals, M.P. (Kofler) 145–147° C.

Tropyl - 2 - phenyl-cyclohexen - 3 - carboxylate methyl-iodide. Colourless crystals, M.P. (Kofler) 272–275° C.

What is claimed is:

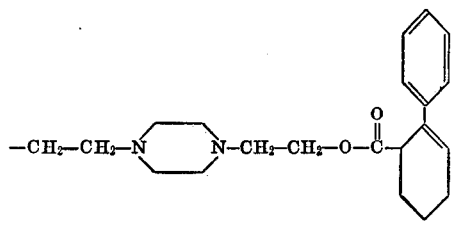

1. The compounds, tropyl - 2-phenyl-cyclohexen-3-carboxylate and physiologically acceptable salts thereof.

2. A compound according to claim 1 wherein said compound is tropyl-2-phenyl-cyclohexen-3-carboxylate methyl iodide.

References Cited

UNITED STATES PATENTS 3,458,507   7/1969   Caldwell et al. _____ 260—292

OTHER REFERENCES

Burger: Medicinal Chemistry, Second Edition, Interscience Publishers, pp. 464, 465, 471 and 497 RS 403 B-8 C.7, 1960.

ALAN L. ROTMAN, Primary Examiner

U.S. Cl. X.R.

260—247.2 B, 268 R, 472, 515 R, 293.72, 293.81; 424—248, 250, 265, 267, 308, 309

UNITED STATES PATENT OFFICE
CERTIFICATE OF CORRECTION

Patent No. 3,699,109          Dated October 17, 1972

Inventor(s) Luigi Turbanti

It is certified that error appears in the above-identified patent and that said Letters Patent are hereby corrected as shown below:

In the title heading in column 1 of the patent insert the following:

-- Claims priority, application Italy October 7, 1967    21367-A/67 -- .

Signed and sealed this 6th day of August 1974.

(SEAL)
Attest:

McCOY M. GIBSON, JR.
Attesting Officer

C. MARSHALL DANN
Commissioner of Patents